United States Patent [19]

Davis

[11] Patent Number: 4,980,989
[45] Date of Patent: Jan. 1, 1991

[54] SIGNALLING CRAB CAGE

[76] Inventor: Gregory D. Davis, 33 Lackawanna Ave., East Stroudsburg, Pa. 18301

[21] Appl. No.: 465,491

[22] Filed: Jan. 16, 1990

[51] Int. Cl.$^5$ ............................................. A01K 69/08
[52] U.S. Cl. ..................................... 43/100; 43/102; 43/105
[58] Field of Search ................ 43/100, 102, 103, 104, 43/105, 17, 17.1

[56] References Cited

U.S. PATENT DOCUMENTS

| | | | |
|---|---|---|---|
| 132,476 | 10/1872 | Livandais | 43/105 |
| 3,314,187 | 4/1967 | Marcinkowski | 43/105 |
| 3,508,358 | 4/1970 | Lee | 43/105 |
| 4,434,575 | 3/1984 | Pearson | 43/100 |
| 4,765,089 | 8/1988 | Rowe | 43/102 |
| 4,831,774 | 5/1989 | Gonzalez | 43/102 |

*Primary Examiner*—Kurt Rowan
*Attorney, Agent, or Firm*—Terry M. Gernstein

[57] ABSTRACT

A crab cage assembly includes a cage unit that has several one-way openings defined therethrough so that a crab can enter the cage but will not be able to exit that cage once inside. The one-way openings are formed by cantilever wires that extend into the cage. A signal system is activated when a captured crab pulls on a bait-like element located in the cage, and signals a crabber that a crab has been captured. The signal system includes either a bell or a special transmitter that emits a signal characteristic of the particular cage assembly so that a crabber working several cages will know which cage contains a crab.

8 Claims, 2 Drawing Sheets

SIGNALLING CRAB CAGE

TECHNICAL FIELD OF THE INVENTION

The present invention relates to the general art of amusement devices, and to the particular field of fishing devices.

BACKGROUND OF THE INVENTION

In recent times, crabbing has increased in popularity, both as a means of making a living and for providing recreation and personal consumption. Crabs are prized for their delicious flavor by many consumers. In the Northeastern United States and in many West Coast areas of the United States, the Alaska King Crab, as well as the dungeness, are quite popular. On the East Coast, one of the favorites is the blue crab.

Technically known as Callinectes, the blue crab is any of a genus of crustaceans of the order Decapoda. Two varieties within the genus are common to the western Atlantic coast, and are prized delicacies. The most common habitat of these creatures include muddy shores, bays, and estuaries. Although the shells of these sea creatures is decidedly more green than blue, the name derives from the distinctive blue legs.

Other unique characteristics of blue crabs are the large sharp spines projecting from each side. Eight short spines occur on each side between the large spine and the eyes. The pincers are large and somewhat unequal in size. A fifth pair of legs is flattened for swimming, and the overall size of the blue crab is generally about three inches in width. They are scavengers and feast on bodies of dead animals.

Due to their flavor, these animals are much desired as delicacies. Therefore, the art of crabbing has included many designs intended to capture these animals.

These designs have included a cage that is lowered into the water, and in which the crab is captured, and retrieved. As discussed above, the natural habitat of such animals is muddy waters, and thus the crabber generally cannot see the cage to determine whether a crab has been captured or not. Time is often wasted as the crabber waits in uncertainty, hesitant to pull up a cage. This drawback is especially problemsome if there are a plurality of cages being worked by a single crabber.

Still further, many crab cages are not designed to trap a crab without damaging that crab as it tries to escape.

Therefore, there is a need for a crab cage especially for blue crabs which will trap the animal without harming it if it attempts escape, and which can send a signal to a crabber that the cage contains at least one animal, with that signal being identifiable with that particular cage so the crabber will know which cage of several cages has a crab trapped therein.

OBJECTS OF THE INVENTION

It is a main object of the present invention is to provide a crab cage especially for blue crabs.

It is another object of the present invention to provide a crab cage especially for blue crabs which will trap the animal without harming it if it attempts escape.

It is another object of the present invention to provide a crab cage especially for blue crabs which will trap the animal without harming it if it attempts escape, and which can send a signal to a crabber that the cage contains at least one animal.

It is another object of the present invention to provide a crab cage especially for blue crabs which will trap the animal without harming it if it attempts escape, and which can send a signal to a crabber that the cage contains at least one animal, with that signal being identifiable with that particular cage.

SUMMARY OF THE INVENTION

These, and other, objects are achieved by a crab cage that is designed especially for blue crabs and which includes holes that gradually decrease in size towards the center of the cage. A crab can squeeze into the cage, but cannot escape. An alarm signal system is included which is connected to a bait-like element located inside the cage. When the trapped crab touches the bait-like element, the alarm is activated. The signal system includes a signal that is peculiar to each crab cage so a crabber having a plurality of cages will be able to identify the cage, or cages, containing crabs.

BRIEF DESCRIPTION OF THE DRAWING FIGURES

DETAILED DESCRIPTION OF THE PREFERRED EMBODIMENT OF THE INVENTION

Figure 1:
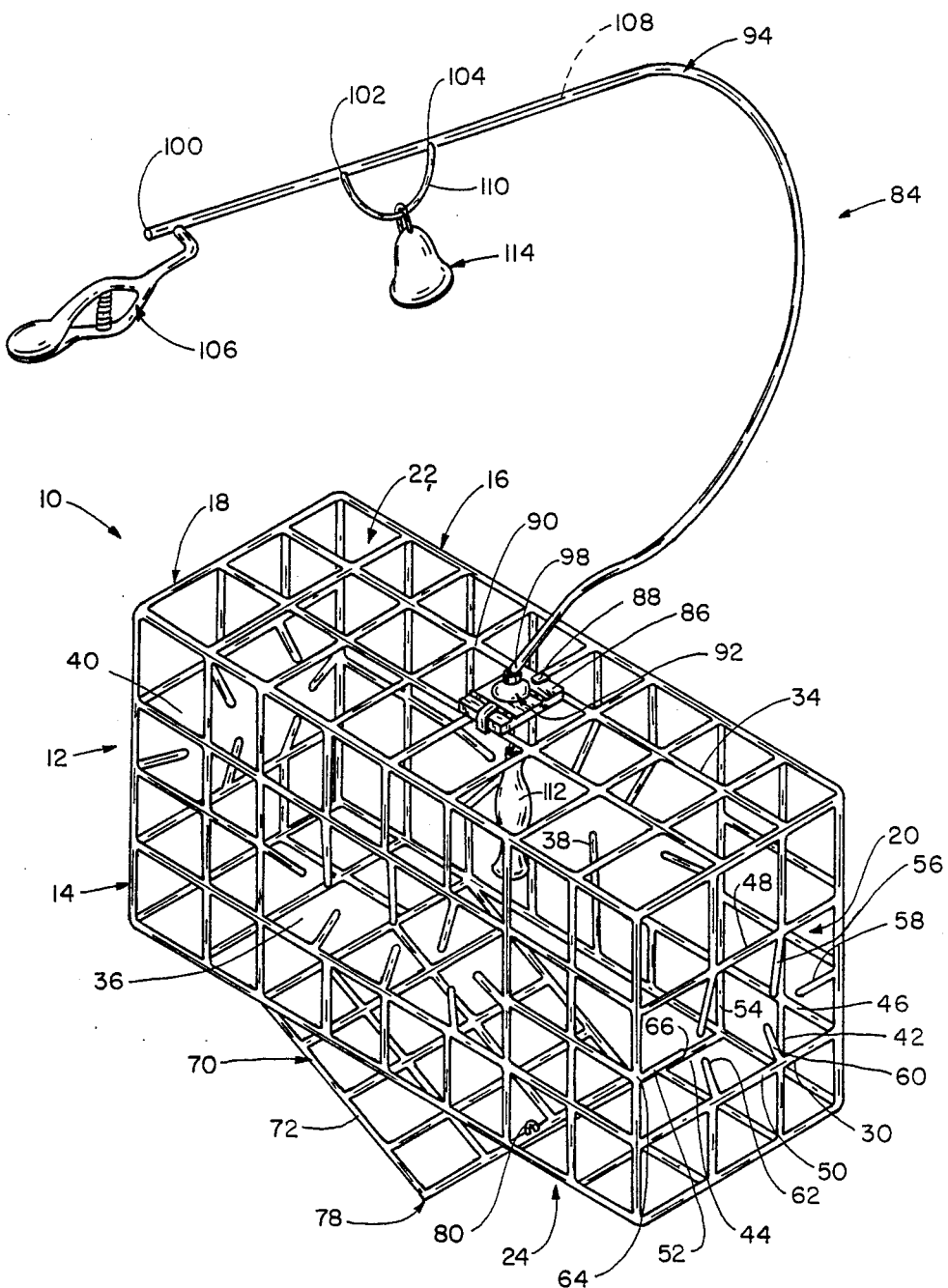
FIG. 1 is a perspective view of a crab cage of the present invention.

Shown in FIG. 1 is a crab cage assembly 10 which will trap blue crabs in a manner that will not expose those crabs to unnecessary danger should they attempt escape, and which will alert a crabber that at least one animal has been captured in the cage.

The assembly 10 includes a cage unit 12 that is in the form of a parallelopiped having planar sides 14 and 16, planar ends 18 and 20, a planar top 22 and a planar bottom 24. The sides cooperate to define a width dimension, the ends co-operate to define a length dimension and the top and bottom co-operate to define a thickness dimension for the cage unit. Each side, end, top and bottom portion of the cage has a center, with the end centers being located on a longitudinal centerline of the cage unit, the side centers being located on a transverse centerline of the cage unit, and the top and bottom centers being located on another transverse centerline of the cage unit.

The sides, ends, top and bottom are all formed by a plurality of orthogonally intersecting wires, such as widthwise wires 30, thicknesswise wires 32 and lengthwise wires 34. The orthogonal intersection of the wires defines an open gridwork pattern that may be essentially invisible to a crab in muddy waters.

Each side 14 and 16 and each end 18 and 20 has a one-way opening 36, 38, 40 and 42, respectively, defined therein. The one-way openings are designed to gradually decrease in size towards the center of the cage unit so a crab can squeeze into the cage via a one-way opening, but cannot escape out of that cage unit via the one-way openings. The size of each one-way opening is approximately three inches wide or three inches long at the smallest location so that a blue crab will not be able to re-enter such one-way opening after entering the cage. However, such three-by-three inch opening is not so small that the crab cannot squeeze through into the cage unit.

The end one-way openings are identical, and thus only one-way opening 42 will be described. Specifically, the opening 42 includes sides 44 and 46, a top 48 and a bottom 50 when the cage unit is oriented as shown in FIG. 1. The openings are all rectangular in shape and each has a center that lies on the center of the planar cage unit end associated therewith.

The opening 42 has six cantilever wires, 52, 54, 56, 58, 60 and 62, with each cantilever wire being affixed at a proximal end thereof, such as proximal end 64 of wire 52, to one wire of the planar cage body end associated therewith and extend to a distal end, such as distal end 66 of wire 52 which is unsupported. The wires 54 and 56 form top cantilever wires, and the wires 60 and 62 form bottom cantilever wires for the position of the cage shown in FIG. 1, while the wires 52 and 58 form side cantilever wires.

Figure 2:
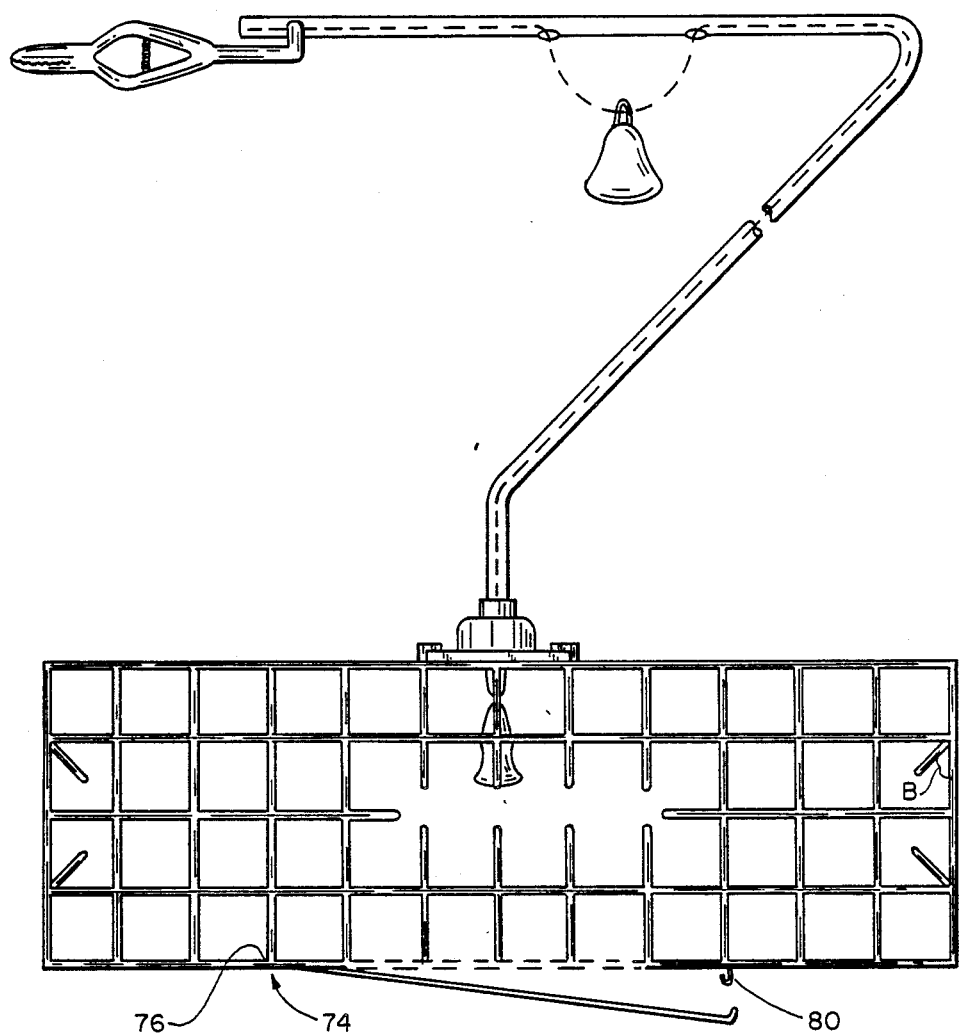
FIG. 2 is an elevational view of the crab cage of the present invention.

While not clearly seen in the figure due to the perspective nature of the figure, all of the cantilever wires extend out of the plane containing the end or side associated therewith, and extend into the cage unit body. As best indicated in FIG. 2, the cantilever wires extend at an angle B that is forty-five degrees with respect to that plane. The opening thus decreases in size towards the center of the cage body. Thus, a crab can squeeze into the cage via the opening, yet cannot escape back out of the opening. The crab is not likely to injure itself as it tries to escape since the distal ends of the cantilever wires will not injure the crab but will prevent it from re-entering the one-way opening.

Referring to FIGS. 1 and 2, it is seen that the cage unit body also includes an access door unit 70 that includes a planar door body 72 having a proximal end 74 attached to the cage unit body bottom by a hinge 76. The door body also has a distal end 78 that co-operates with a lock 80 affixed to the cage unit body bottom. The lock 80 captures the distal end of the door body to attach that door body to the cage unit body bottom. The preferred form of the lock 80 is a simple hook.

The door swings out of the plane of the cage unit body bottom to open the cage.

The cage assembly further includes a tethering unit 84, best shown in FIGS. 1 and 2 as including a plate-like base 86 which is releasably attached to the cage unit body top by two spring C-clips 88 and 90 that force the base 86 against the wires of the top. A tube clamp element 92 is affixed to the base 86, and a flexible hollow tube 94 is affixed to the base by the tube clamp element 92. The tube is elongate and extends lengthwise from a proximal end 98 thereof that is attached to the tube clamp element, to a distal end 100 that is located remotely from the cage unit. Preferably, the tube is clear and is made of material such as clear plastics-type material to be virtually invisible in the muddy, murky waters in which the cage assembly will be used.

The tube 94 has two holes, 102 and 104, defined thereinto at locations that are spaced apart from each other and from the distal end along the length dimension of the tube, and a spring-biased clamp 106 is attached to the tube near the distal end 100. The clamp 106 is spring biased into the closed condition shown in FIG. 1 to grasp a support and hold the cage in a desired location via the tube 94.

The tethering unit further includes a continuous string element 108 that is located inside the tube and extends lengthwise thereof. The string element is affixed at one end thereof to the distal end of the tube and extends through the base 86 into the interior of the cage unit body. The string thus has a second end that is located inside the cage unit 12 and is spaced above the bottom of the cage unit body bottom. The string extends through the holes 102 and 104 to define a loop 110 outside of the tube. The loop will change size as the string element is moved inside the tube.

A bait-like element 112 is pendently suspended from the string element second end to dangle inside the cage above the cage bottom and spaced from the cage sides and ends. The bait-like element will thus be free to move and sway as the water currents pass through the open meshwork of the cage unit. Such movement of the bait-like element will attract a crab and entice that crab into the cage unit.

The bait-like element 112 is attached to the string to move that string if the bait-like element is pulled. Thus, a crab caught in the cage may pull on the bait-like element and such pull will move the string longitudinally of the tube. Thus movement will move the loop 110.

A signal element 114 is attached to the loop to be moved by that loop as the loop is moved. The preferred embodiment of the signal element 114 is a bell; however, other signals can also be used. Thus, when a trapped crab pulls on the bait-like element, the bell is sounded, thereby alerting a crabber that a crab has been captured.

Various different bells are used if several cages are used so that each bell will emit a signal that is characteristic of a particular cage whereby a crabber working several cages will know which cage has trapped a crab. For example, one bell can be larger than another to emit a sound that differs from the smaller bell.

Figure 3:
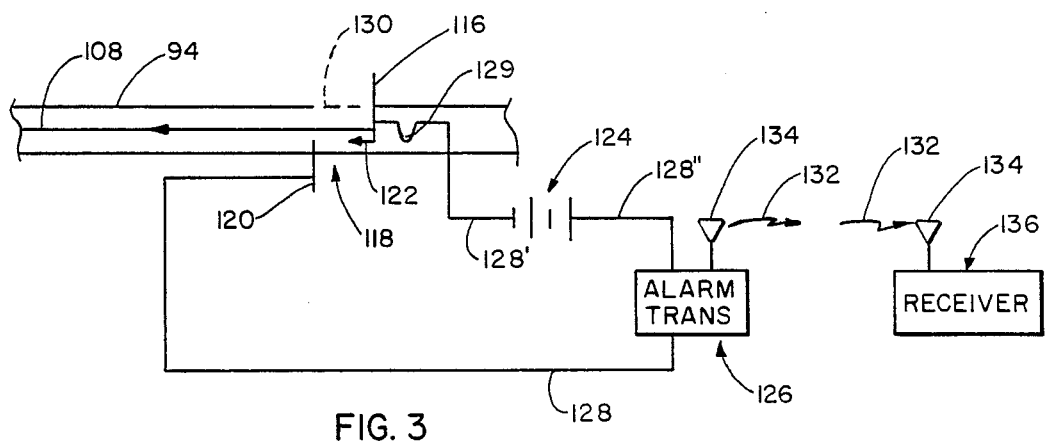
FIG. 3 is a schematic circuit illustrating an alarm system which will alert a crabber that a particular cage has trapped at least one crab.

Another form of the signal means is shown in FIG. 3. The string element 108 is attached to one contact 116 of a switch element 118, with the other contact 120 thereof being fixed to the tube 94. The contact 116 is mounted on the tube to be movable in the direction indicated by arrow 122 as the string element is moved due to a captured crab pulling on the bait-like element. The switch element 118 forms an electrical connection between a power source 124 and an alarm signal transmitter 126 via first line conductor 128, second line conductor 128′ and third line conductor 128″. The line conductor 128 is looped at 129 to permit movement of the contact 116. The loop 129 is shown as being located inside the tube 94, but could be located outside the tube as loop 110. The contact 116 is slidably mounted on the tube in a slot 130, and when a captured crab pulls on the bait-like element, the contact 116 is pulled into contact with the fixed contact 120 to complete the circuit and power the alarm transmitter 126. This transmitter emits a signal 132 from an antenna 134 that is characteristic of the particular crab cage unit with which it is associated. For example, one cage can have a series of short pulses associated therewith, while another cage can have a series of long pulses associated therewith, while a third cage can have a combination of both short and long pulses associated therewith. Such signal will identify the particular cage unit to a crabber working several cage units.

The signal 132 is received by an antenna 134 of a receiver unit 136 that is remotely located from the transmitter unit. The receiver unit can be located in a headphone set worn by the crabber, for example.

The C-clips are used to permit substitution of a FIG. 3 system for the string element/bell system discussed above.

It is understood that while certain forms of the present invention have been illustrated and described herein, it is not to be limited to the specific forms or arrangements of parts described and shown.

I claim:

1. A crab cage assembly comprising:
 (A) a cage unit which includes
  (1) a body having planar sides, planar ends, a planar top and a planar bottom, said body having a length dimension defined between said ends, a width dimension defined between said sides and a thickness dimension defined between said bottom and said top, said body further including an interior volume and a center in said interior volume, each of said body sides, ends, top and bottom having a center, which is aligned with said body center, with said end centers being aligned with each other, said side centers being aligned with each other, and said top and bottom centers being aligned with each other,
  (2) a multiplicity of wire elements which include
   (a) a plurality of lengthwise wires,
   (b) a plurality of widthwise wires,
   (c) a plurality of thicknesswise wires,
   (d) the wires in each end, side, top and bottom being arranged orthogonally to form an open meshwork arrangement,
  (3) an end one-way opening defined through each body end and including
   (a) a top, a bottom and ends connecting said end one-way opening top to said end one-way opening bottom,
   (b) two top cantilever wires each having a proximal end connected to a wire element and a distal end,
   (c) two bottom cantilever wires each having a proximal end connected to a wire element and a distal end,
   (d) all of said cantilever wires extending out of a plane containing the body end associated therewith, and forming an acute angle with such plane,
   (e) said end one-way openings each having a center that is aligned with the center of the end associated therewith,
  (4) a side one-way opening defined through each body side and including
   (a) a top, a bottom and ends connecting said side one-way opening top to said side one-way opening bottom,
   (b) two top cantilever wires each having a proximal side connected to a wire element and a distal end,
   (c) two bottom cantilever wires each having a proximal end connected to a wire element and a distal end,
   (d) all of said cantilever wires extending out of a plane containing the body side associated therewith, and forming an acute angle with such plane,
   (e) said side one-way openings each having a center that is aligned with the center of the side associated therewith,
  (5) an access door unit in said body bottom and which includes
   (a) a planar door body having a proximal end and a distal end,
   (b) a hinge element connecting said door body proximal end to said cage unit body bottom,
   (c) a lock element on said cage unit body bottom which co-operates with said door unit body distal end to releasably attach said door unit body distal end to said cage unit body bottom;
 (B) a tethering unit which includes
  (1) a base,
  (2) two spring C-clips attaching said base to wire elements in said cage unit body top,
  (3) a tube clamp element mounted on said tethering unit base,
  (4) a flexible hollow tube attached at a first end to said tube clamp element, said flexible tube having a second end spaced from said tube first end and a length dimension defined between said first and second ends, and two holes defined through said tube at locations that are spaced apart from each other and from said tube second end along said tube length dimension,
  (5) a spring clamp mounted on said tube near said tube second end,
  (6) a string element located inside said tube and extending lengthwise of said tube, said string element extending through said tethering unit base into said cage unit and having a second end located inside said cage unit body and spaced from said cage unit body sides, ends, top and bottom, said string element extending through said tube holes to form a loop that is located outside said tube,
  (7) a signal means attached to said string element to be activated when said string element is moved within said tube; and
 (C) a bait-like element attached to said string element second end.

2. The crab cage assembly defined in claim 1 wherein said signal means includes a bell.

3. The crab cage assembly defined in claim 1 wherein said signal means includes a switch mounted on said tube and including
 (a) a first contact element fixedly mounted on said tube,
 (b) a second contact element movably mounted on said tube,
 (c) a power source,
 (d) an alarm signal transmitter which transmits a signal when activated,
 (e) a first line conductor connecting said first contact to said alarm signal transmitter,
 (f) a second line conductor connecting said second contact to said power source, and
 (g) a third line conductor connecting said power source to said signal transmitter so that power will be applied to said signal transmitter when said first contact contacts said second contact to activate said signal transmitter.

4. The crab cage assembly defined in claim 3 wherein said signal transmitter emits a signal that is characteristic of said cage unit.

5. The crab cage assembly defined in claim 4 further including a signal receiver means located remotely from said signal transmitter.

6. The crab cage assembly defined in claim 5 wherein said tube is translucent.

7. The crab cage assembly defined in claim 2 wherein there are a plurality of different cage units and each cage unit has a bell associated therewith that differs from other bells associated with other cage units.

8. The crab cage assembly defined in claim 7 wherein each end one-way opening and each side one-way opening has a length dimension and a width dimension that are each less than three inches.

* * * * *